(12) United States Patent
Ruberte Sanchez et al.

(10) Patent No.: US 9,664,389 B2
(45) Date of Patent: May 30, 2017

(54) ATTACHMENT ASSEMBLY FOR PROTECTIVE PANEL

(71) Applicant: UNITED TECHNOLOGIES CORPORATION, Hartford, CT (US)

(72) Inventors: Jose E. Ruberte Sanchez, Jupiter, FL (US); Timothy J. McAlice, Jupiter, FL (US); Kevin L. Rugg, Fairfield, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 244 days.

(21) Appl. No.: 14/568,896

(22) Filed: Dec. 12, 2014

(65) Prior Publication Data

US 2016/0252248 A1   Sep. 1, 2016

Related U.S. Application Data

(60) Provisional application No. 61/915,189, filed on Dec. 12, 2013.

(51) Int. Cl.
| | |
|---|---|
| *F23R 3/00* | (2006.01) |
| *F02K 1/82* | (2006.01) |
| *F23M 5/04* | (2006.01) |
| *F23R 3/60* | (2006.01) |

(52) U.S. Cl.
CPC .............. *F23R 3/002* (2013.01); *F02K 1/822* (2013.01); *F23M 5/04* (2013.01); *F23R 3/007* (2013.01); *F23R 3/60* (2013.01); *F23M 2900/05004* (2013.01); *Y02T 50/675* (2013.01)

(58) Field of Classification Search
CPC . F23R 3/002; F23R 3/007; F23M 5/04; F02K 1/822
See application file for complete search history.

(56) References Cited

U.S. PATENT DOCUMENTS

| | | | | |
|---|---|---|---|---|
| 4,513,569 | A | * | 4/1985 | Sasaki ...................... F23M 5/04 285/402 |
| 5,363,643 | A | * | 11/1994 | Halila ..................... F23R 3/002 60/752 |
| 5,799,491 | A | | 9/1998 | Bell et al. |
| 6,085,515 | A | * | 7/2000 | Walz ........................ F23M 5/04 110/336 |
| 6,283,660 | B1 | | 9/2001 | Furlong et al. |
| 6,664,953 | B2 | | 12/2003 | Quek |
| 7,093,439 | B2 | | 8/2006 | Pacheco-Tougas et al. |
| 7,508,383 | B2 | | 3/2009 | Lev et al. |
| 7,789,265 | B2 | * | 9/2010 | Kearney ................ B60N 3/106 220/737 |
| 7,805,945 | B2 | | 10/2010 | Grote et al. |
| 7,908,867 | B2 | | 3/2011 | Keller et al. |

(Continued)

FOREIGN PATENT DOCUMENTS

| | | |
|---|---|---|
| EP | 1221383 | 7/2002 |
| EP | 1635118 | 3/2006 |
| GB | 2322401 | 8/1998 |

*Primary Examiner* — Arun Goyal
(74) *Attorney, Agent, or Firm* — Carlson, Gaskey & Olds P.C.

(57) ABSTRACT

One exemplary embodiment of this disclosure relates to a gas turbine engine. The engine includes a first attachment member including an opening, a second attachment member including a loop at least partially extending through the opening, and a pin between the first attachment member and the loop.

17 Claims, 5 Drawing Sheets

(56) References Cited

U.S. PATENT DOCUMENTS

| | | | |
|---|---|---|---|
| 8,113,004 | B2 | 2/2012 | Carlisle et al. |
| 8,266,914 | B2 | 9/2012 | Hawie et al. |
| 8,469,209 | B2 * | 6/2013 | Holmes ................ B66C 23/163 212/179 |
| 8,474,633 | B2 * | 7/2013 | Holmes ................ F01D 25/285 212/179 |
| 9,267,386 | B2 * | 2/2016 | Turner ................ F01D 11/008 |
| 2002/0116929 | A1 | 8/2002 | Snyder |
| 2002/0184892 | A1 | 12/2002 | Calvez et al. |
| 2007/0144178 | A1 | 6/2007 | Burd et al. |
| 2013/0152591 | A1 | 6/2013 | Dery et al. |

* cited by examiner

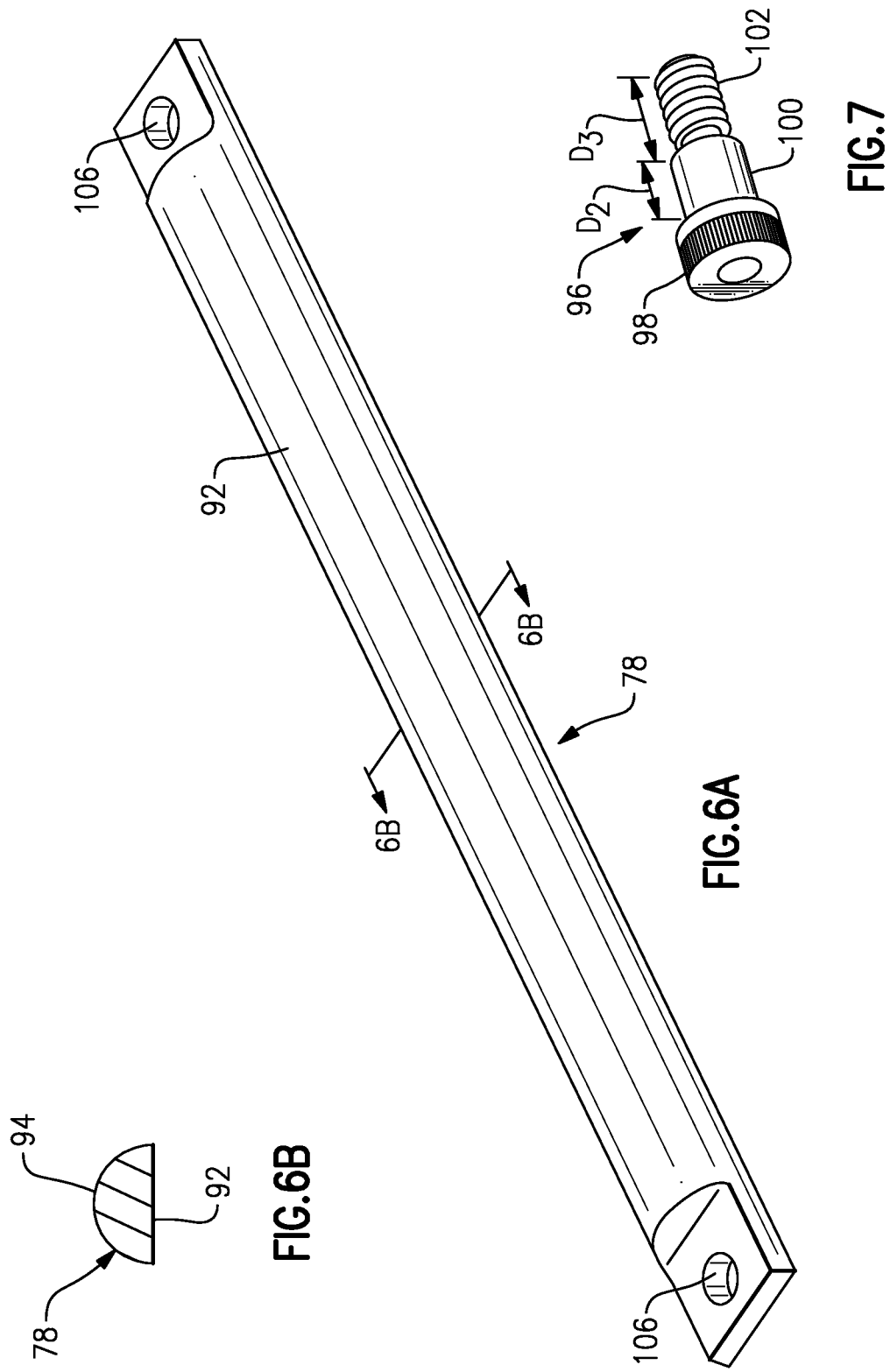

ABSTRACT ASSEMBLY FOR
PROTECTIVE PANEL

BACKGROUND

Gas turbine engines include a core flow path where air is communicated to a combustor section, combined with fuel, and ignited to generate a high pressure exhaust gas stream. The high pressure exhaust gas stream includes relatively high temperature gases. Various portions of the engine, such as combustor liners and exhaust nozzles, are directly exposed to this high pressure exhaust gas stream, and may include metal plates configured to absorb various structural loads in the engine. Ceramic matrix composite (CMC) panels are sometimes used to protect the metal plates from the high pressure exhaust gas stream. In one known example, a CMC panel is directly fastened to a metal plate by way of a fastener.

SUMMARY

One exemplary embodiment of this disclosure relates to a gas turbine engine. The engine includes a first attachment member including an opening, a second attachment member including a loop at least partially extending through the opening, and a pin between the first attachment member and the loop.

In a further embodiment of any of the above, the first attachment member is a liner, and wherein the second attachment member is a panel.

In a further embodiment of any of the above, the panel is formed of a ceramic matrix composite (CMC) material.

In a further embodiment of any of the above, a spring is provided between the pin and the liner, the spring urging the pin into contact with the loop In a further embodiment of any of the above, the pin has a substantially planar surface in contact with the spring, and an arcuate surface in contact with the loop.

In a further embodiment of any of the above, the panel includes a first surface facing in a first direction toward a relatively hot gas path within the engine, and a second facing in a direction opposite the first surface, the second surface of the panel urged into contact with the liner via the contact between the spring and the pin.

In a further embodiment of any of the above, the loop extends from the second surface.

In a further embodiment of any of the above, the panel includes a row of aligned loops, and wherein the pin extends through each of the loops in the row.

In a further embodiment of any of the above, fasteners are provided through the ends of the pin to fasten the pin to the liner.

In a further embodiment of any of the above, the fasteners have a length with a threaded portion and a smooth, non-threaded portion, the threaded portion engaged with a corresponding threaded opening in the liner.

In a further embodiment of any of the above, the ends of the pin include a slot, the slot arranged relative to the non-threaded portion such that the pin is slidable along the length of the fasteners.

In a further embodiment of any of the above, the liner is one of an exhaust nozzle and a combustor liner.

In a further embodiment of any of the above, the liner and the panel are spaced-apart from an engine structure, the engine structure being one of an exhaust nozzle and a combustor liner.

Another exemplary embodiment of this disclosure relates to an attachment assembly including a first attachment member including an opening, a second attachment member including a loop at least partially extending through the opening, and a pin between the loop and the first attachment member.

In a further embodiment of any of the above, a spring is configured to urge the pin into contact with the loop.

In a further embodiment of any of the above, the spring is attached to the first attachment member.

In a further embodiment of any of the above, the second attachment member includes a row of aligned loops, and wherein the pin extends through each of the loops in the row.

In a further embodiment of any of the above, the second attachment member is formed of a ceramic matrix composite (CMC) material.

Still another exemplary embodiment of this disclosure relates to a method. The method includes the steps of inserting loops through corresponding openings, the openings provided in a first attachment member, and the loops provided in a second attachment member. The method further includes inserting a pin between the loops and the first attachment member, and urging the pin into contact with the loops via a spring.

In a further embodiment, the method also includes fastening the pin to the first attachment member via a fastener, and sliding the pin along a length of the fastener.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

FIG. 6A illustrates an example pin used in connection with the panel and liner of FIG. 2.

FIG. 6B is a cross-sectional view taken along line 6B-6B in FIG. 6A.

FIG. 7 illustrates an example fastener used in connection with the panel and liner of FIG. 2.

DETAILED DESCRIPTION

Figure 1:
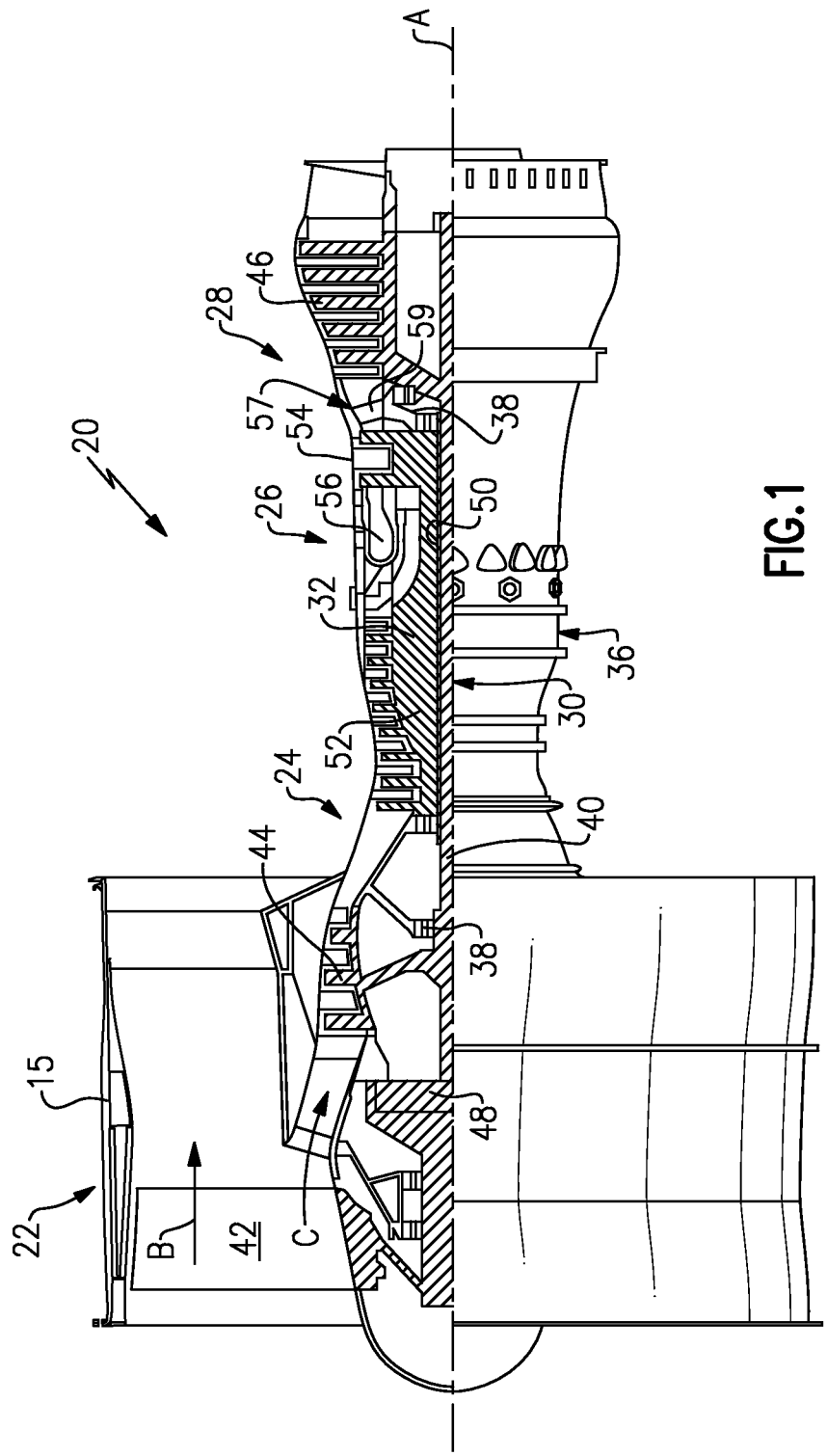
FIG. 1 illustrates a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Figure 2:
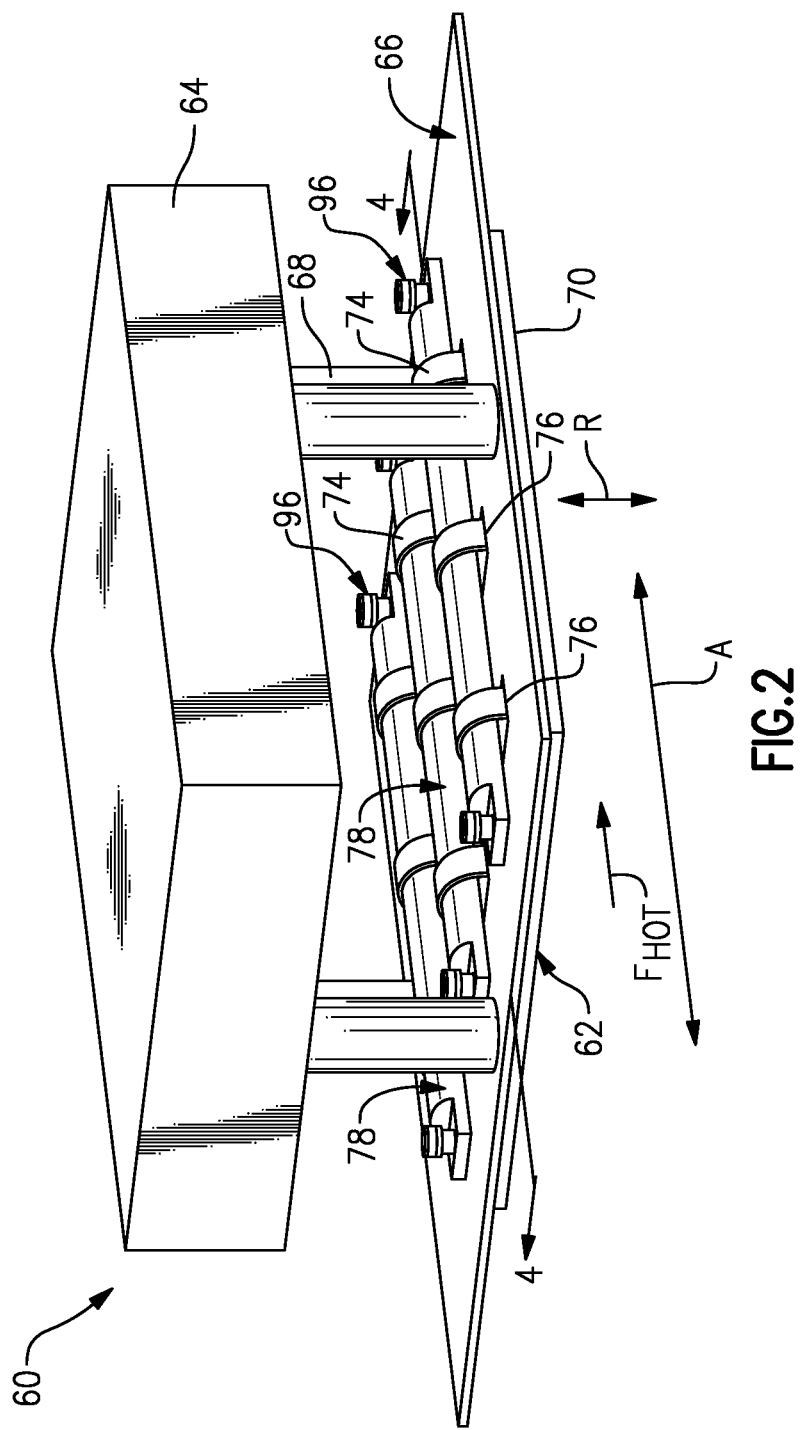
FIG. 2 is a perspective view of an example attachment assembly having a panel and liner for use with the engine of FIG. 1.

FIG. 2 illustrates an example attachment assembly 60 for use in the engine 20. In this example, the attachment assembly supports a protective panel 62 arranged to protect an engine support structure 64. The panel 62 may be made of a ceramic matrix composite (CMC) material, and the engine support structure 64 which may be made of a metal. CMC is relatively temperature resistant, while metal has the benefit of providing increased structural support. It should be understood that this application extends to other materials with similar temperature resistant and structural properties.

The engine support structure 64 in one example is a combustor liner of the engine 20. In another example, the engine support structure 64 is an exhaust nozzle of the engine 20. It should be understood that this disclosure extends to other types of structures within the gas turbine engine 20. The engine support structure 64 may be relatively flat (as shown) in some applications, such as in an exhaust nozzle, or may be curved in other applications, such as in a combustor liner. Likewise, the panel 62 and liner 66 may be shaped to correspond to the shape of the engine support structure.

In this example, the panel 62 is supported relative to a liner 66, which is connected to the engine support structure 64 via a plurality of spacers 68. The spacers 68 may be integrally formed with the liner 66 and may be welded to the engine support structure 64, or vice versa. The liner 66 may be connected to the engine support structure 64 in any other manner, however.

As illustrated in FIG. 2, the liner 66 is spaced-apart from the engine support structure 64 via the spacers 68. It is possible to provide a cooling flow path between the engine support structure 64 and the liner 66. In another example, however, the liner 66 itself represents an engine support structure, such that the panel 62 is directly attached to the engine support structure in the way panel 62 is attached to the liner 66.

Figure 3B:
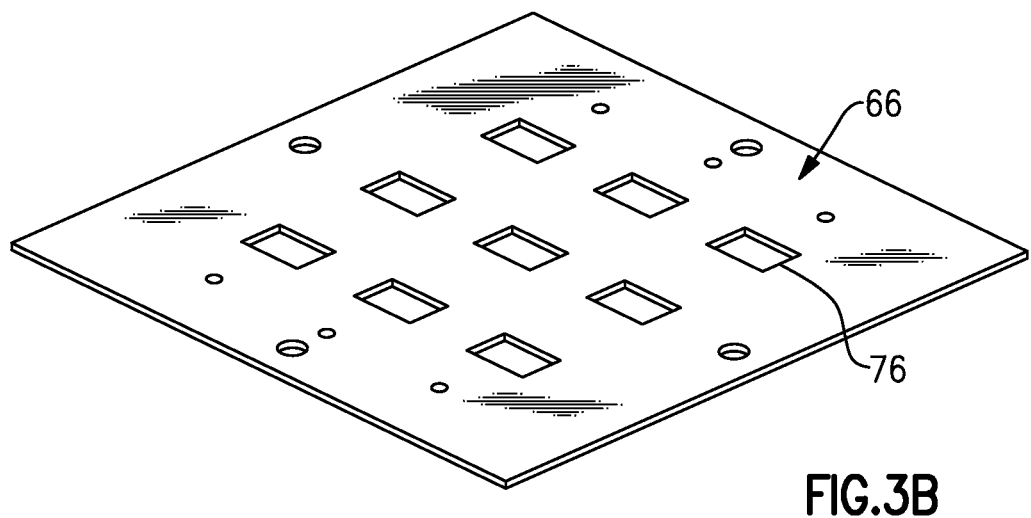
FIGS. 3A-3B illustrate the panel and liner of FIG. 2, respectively.
Figure 3A:
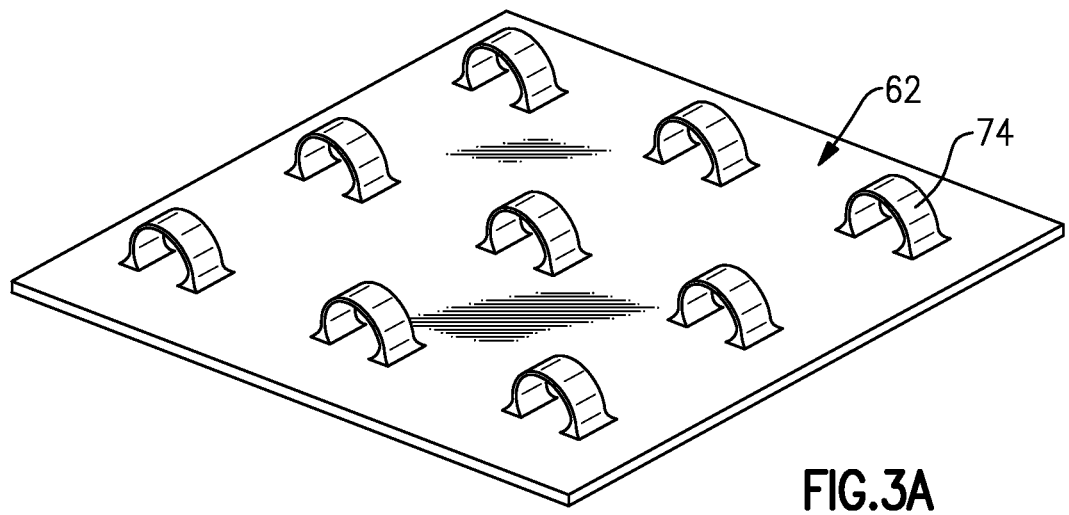
Figure 4:
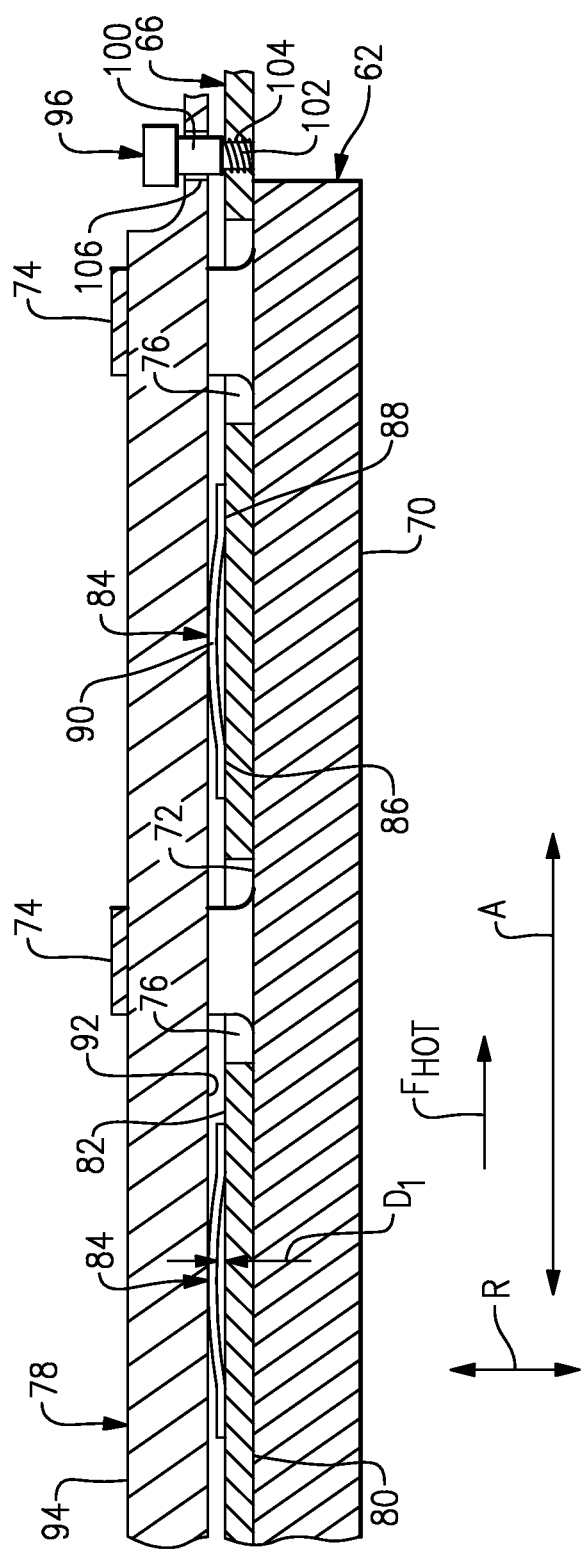
FIG. 4 is a cross-sectional view taken along line 4-4 in FIG. 2.

With reference to FIGS. 2-4, the panel 62 includes a first surface 70 exposed to a relatively hot gas path, such as the core airflow path C, illustrated schematically as $F_{HOT}$. The panel 62 further includes a second surface 72 opposite the first surface 70. The panel 62 is formed with a plurality of loops 74 (FIG. 3A) extending outward, in the radial direction R, from the second surface 72. The loops 74 extend at least partially through a corresponding opening 76 (FIG. 3B) in the liner 66. While the illustrated loops 74 are semi-circular, the loops 74 may be different shapes.

The panel 62 may be formed by a plurality of layered CMC sheets. In this example, some of the CMC sheets may be molded, integrally with the remainder of the panel 62, around a die to form the loops 74. In another example, the loops are formed and consolidated before being incorporated into the remainder of the panel 62. That is, the loops 74 may be pre-cured constructs that are incorporated into the panel 62 when the panel 62 is cured. The liner 66, on the other hand, may be formed of metal using known techniques.

As illustrated in FIG. 2, the loops 74 are aligned with one another in rows, each of which receive a corresponding pin 78. The pins 78 in this example are semi-arcuate in cross-section (FIG. 6B). The pins 78 may have other shapes, however. When inserted through the loops 74, the pins 78 urge the panel 62 into contact with the liner 66, as will be described below.

Figure 5:
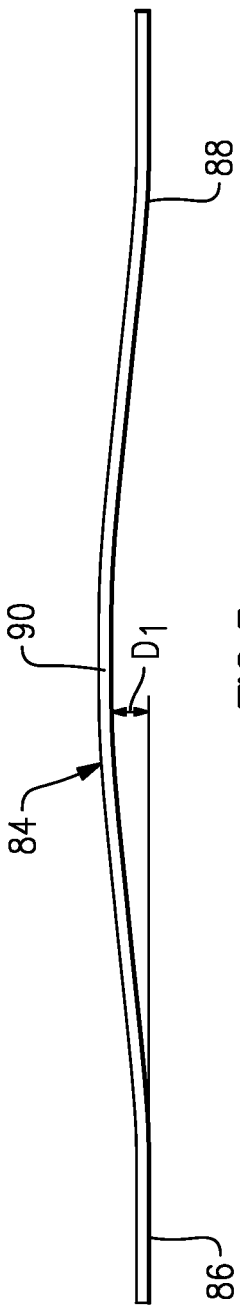
FIG. 5 illustrates an example spring used in connection with the panel and liner of FIG. 2.

With reference to FIG. 4, the liner 66 includes a first surface 80 directly contacting the second surface 72 of the panel 62, and a second surface 82 opposite the first surface 80. A plurality of springs 84 (FIG. 5) are attached to the second surface 82. In this example, each spring 84 is provided by a single piece of material, which is attached, such as by welding, to the second surface 82 at ends 86, 88. The spring 84 may be attached to the pin 78 in other examples, however. The spring 84 includes a curved portion 90 between the ends 86, 88. The curved portion 90 is spaced from the second surface 82 by a distance $D_1$, and is biased away from the second surface 82 by the resiliency of the spring 84. In one example the spring 84 is made of a metal. Other spring types and material types come within the scope of this disclosure.

With reference to FIGS. 4 and 6A-6B, the springs 84 contact a relatively planar, lower surface 92 of the pin 78. The springs 84 urge the pin 78 against the loops 74. In this example, the pin 78 includes an arcuate, upper surface 94 corresponding to the contour of the loops 74. The springs 84 essentially preload the panel 62 into contact with the liner 66, by way of the contact between the springs 84 and the pin 78 (and, in turn, contact between the pin 78 and the loops 74).

The pin 78 is connected to the liner 66 via a plurality of fasteners 96, in this example. The detail of an example fastener 96 is illustrated in FIG. 7. The fasteners 96 include a head 98, a generally smooth, non-threaded portion 100 extending a distance D2 from the head 98, and a threaded portion 102 extending a distance D3 from the non-threaded portion 100 to a terminal end opposite the head 98. The threaded portion 102 is received in a threaded opening 104 in the liner 66 (FIG. 4) to secure the fasteners 96 relative to the liner 66.

The ends of the pin 78 include slots 106 to cooperate with the cylindrical portion 100 of the fasteners 96. The non-threaded portions 100 and the slots 106 allow for relative movement between the pin 78 and the liner 66 along the length of the fasteners 96. As the springs 84 urge the pin 78 away from the liner 66, the pin 78 may move along the fasteners 96 to engage the loops 74, leading to a more reliable connection.

The above-discussed assembly 60 provides a reliable attachment for the panel 62. The assembly 60 reduces force concentrations on the panel 62, and does not require any openings or orifices to be machined through the panel 62, which may compromise the structural integrity of the panel 62.

While reference herein has been made to the axial and radial directions A, R, it should be understood that these terms are used only for purposes of explanation, and should not be considered otherwise limiting. In other words, the assembly 60 may be oriented within an engine 20 in any number of orientations.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine including an attachment structure, comprising:
    a liner including an opening;
    a panel including a loop at least partially extending through the opening; and
    a pin between the liner and the loop; and
    a spring provided between the pin and the liner, the spring urging the pin into contact with the loop.

2. The engine as recited in claim 1, wherein the panel is formed of a ceramic matrix composite (CMC) material.

3. The engine as recited in claim 1, wherein the pin has a substantially planar surface in contact with the spring, and an arcuate surface in contact with the loop.

4. The engine as recited in claim 1, wherein the panel includes a first surface facing in a first direction toward a relatively hot gas path within the engine, and a second surface facing in a direction opposite the first surface, the second surface of the panel urged into contact with the liner via the contact between the spring and the pin.

5. The engine as recited in claim 4, wherein the loop extends from the second surface.

6. The engine as recited in claim 1, wherein the panel includes a row of aligned loops, and wherein the pin extends through each of the loops in the row.

7. The engine as recited in claim 1, wherein fasteners are provided through ends of the pin to fasten the pin to the liner.

8. The engine as recited in claim 7, wherein the fasteners have a length with a threaded portion and a smooth, non-threaded portion, the threaded portion engaged with a corresponding threaded opening in the liner.

9. The engine as recited in claim 8, wherein the ends of the pin include a slot, the slot arranged relative to the non-threaded portion such that the pin is slidable along the length of the fasteners.

10. The engine as recited in claim 1, wherein the liner is one of an exhaust nozzle and a combustor liner.

11. The engine as recited in claim 1, wherein the liner and the panel are spaced-apart from an engine structure, the engine structure being one of an exhaust nozzle and a combustor liner.

12. A gas turbine engine including an attachment assembly, comprising:
    a first attachment member including an opening;
    a second attachment member including a loop at least partially extending through the opening;
    a pin between the loop and the first attachment member;
    fasteners provided through ends of the pin to fasten the pin to the first attachment member, wherein the fasteners have a length with a threaded portion and a smooth, non-threaded portion, the threaded portion engaged with a corresponding threaded opening in the first attachment member, and wherein the ends of the pin include a slot, the slot arranged relative to the non-threaded portion such that the pin is slidable along the length of the fasteners; and
    a spring configured to urge the pin into contact with the loop.

13. The gas turbine engine as recited in claim 12, wherein the spring is attached to the first attachment member.

14. The gas turbine engine as recited in claim 12, wherein the second attachment member includes a row of aligned loops, and wherein the pin extends through each of the loops in the row.

15. The gas turbine engine as recited in claim 12, wherein the second attachment member is formed of a ceramic matrix composite (CMC) material.

16. A method of attaching a panel to a liner within a gas turbine engine, comprising:
    inserting loops through corresponding openings, the openings provided in the liner, and the loops provided in the panel;
    inserting a pin between the loops and liner: and urging the pin into contact with the loops via a spring.

17. The method as recited in claim 16, including:
    fastening the pin to the liner member via a fastener; and
    sliding the pin along a length of the fastener.

* * * * *